(12) United States Patent
Grigorov et al.

(10) Patent No.: US 11,261,796 B2
(45) Date of Patent: Mar. 1, 2022

(54) AIR TURBINE STARTER AIR VALVE

(71) Applicant: Hamilton Sundstrand Corporation, Charlotte, NC (US)

(72) Inventors: Boris N. Grigorov, Granby, CT (US); Leo J. Veilleux, Jr., Wethersfield, CT (US)

(73) Assignee: Hamilton Sundstrand Corporation, Farmington, CT (US)

( * ) Notice: Subject to any disclaimer, the term of this patent is extended or adjusted under 35 U.S.C. 154(b) by 92 days.

(21) Appl. No.: 16/725,177

(22) Filed: Dec. 23, 2019

(65) Prior Publication Data

US 2021/0189968 A1 Jun. 24, 2021

(51) Int. Cl.
*F02C 7/277* (2006.01)
*F16K 31/05* (2006.01)
*F02C 3/04* (2006.01)
*F02C 9/18* (2006.01)

(52) U.S. Cl.
CPC .............. *F02C 7/277* (2013.01); *F02C 3/04* (2013.01); *F02C 9/18* (2013.01); *F16K 31/055* (2013.01);
(Continued)

(58) Field of Classification Search
CPC ........ F16K 31/05; F16K 31/055; F16K 31/14; F16K 11/085; F16K 11/0853;
(Continued)

(56) References Cited

U.S. PATENT DOCUMENTS 2,961,586 A * 11/1960 Morrell ................. F16K 31/00
318/611
4,805,873 A * 2/1989 Mouton ................. F02C 7/277
251/30.05
(Continued)

FOREIGN PATENT DOCUMENTS

EP 3412896 A1 12/2018
EP 3514350 A2 7/2019
WO 2006/085920 A2 8/2006

OTHER PUBLICATIONS

European Search Report for EP Application No. 20215981.0 dated Apr. 20, 2021.

*Primary Examiner* — Stephanie Sebasco Cheng
(74) *Attorney, Agent, or Firm* — Carlson, Gaskey & Olds, P.C.

(57) ABSTRACT

A starter air valve has a valve member and an actuator. A rotary spool valve has a rotatable valve body and an outer housing to selectively provide three modes of operation for the starter air valve. A first mode of operation connects air through the rotatable valve body to communicate with an actuator control, and to receive air back from the actuator control. The rotatable valve body then communicates the air to the actuator. In a second mode the rotatable valve body blocks communication between the actuator control and the actuator, and delivers air through a variable area port in a wall of the rotatable valve body to bypass the valve member. In a third mode the rotatable valve body blocks communication between the actuator and the actuator control, and (Continued)

connects air to the actuator without having passed to the actuator control. A starter air system is also disclosed.

20 Claims, 8 Drawing Sheets

(52) U.S. Cl.
CPC .... *F05B 2220/50* (2013.01); *F05D 2220/323* (2013.01); *F05D 2220/50* (2013.01); *F05D 2260/85* (2013.01); *F05D 2270/304* (2013.01)

(58) Field of Classification Search
CPC ........ F16K 35/027; F01D 19/00; F01D 19/02; F01D 25/34; F01D 21/00; F01D 21/06; F05D 2260/85; F05D 2270/095; F02C 7/26; F02C 7/268; F02C 7/27; F02C 7/275; F02C 7/277
USPC .......................................... 251/30.01, 25, 28
See application file for complete search history.

(56) References Cited

U.S. PATENT DOCUMENTS

| | | | | |
|---|---|---|---|---|
| 4,841,816 A * | 6/1989 | Bullock | .................. | F16H 61/12 |
| | | | | 477/131 |
| 4,916,437 A * | 4/1990 | Gazzaz | ..................... | F17D 5/02 |
| | | | | 251/129.01 |
| 6,684,898 B2 * | 2/2004 | Wiggins | .................. | F02C 7/277 |
| | | | | 137/15.25 |
| 6,694,746 B2 * | 2/2004 | Reed | ....................... | F02C 7/047 |
| | | | | 137/488 |
| 7,475,863 B2 * | 1/2009 | Donovan | .............. | F16K 31/402 |
| | | | | 251/285 |
| 7,650,905 B2 * | 1/2010 | Kubota | ............... | F16K 31/1635 |
| | | | | 137/554 |
| 8,201,572 B2 * | 6/2012 | Segal | ...................... | E03B 7/071 |
| | | | | 137/15.11 |
| 9,157,374 B2 * | 10/2015 | Cortelli | .................... | F02C 7/27 |
| 9,957,899 B1 | 5/2018 | Greenberg et al. | | |
| 2010/0085676 A1 * | 4/2010 | Wilfert | .................... | F02N 11/08 |
| | | | | 361/170 |
| 2012/0211681 A1 * | 8/2012 | Wang | .................. | F16K 31/1635 |
| | | | | 251/30.01 |
| 2015/0308578 A1 * | 10/2015 | Block, III | ........... | F04B 43/1269 |
| | | | | 137/1 |
| 2018/0209347 A1 | 7/2018 | Kelly et al. | | |
| 2018/0346100 A1 * | 12/2018 | Veilleux, Jr | .......... | F16K 31/055 |
| 2019/0226405 A1 | 7/2019 | Kelly et al. | | |
| 2019/0242269 A1 | 8/2019 | Grigorov et al. | | |

* cited by examiner

AIR TURBINE STARTER AIR VALVE

BACKGROUND

This application relates to a starter air valve for an air turbine starter.

Gas turbine engines are known, and typically include a compressor compressing air and delivering it into a combustor where it is mixed with fuel and ignited. Products of the combustion pass downstream over turbine rotors, driving them to rotate. The turbine rotor, in turn, drives a compressor rotor.

To start a gas turbine engine, it is known to initially have a drive input to rotate the compressor rotor and the turbine rotor such that combustion can begin. Typically, an air turbine starter drives a shaft to, in turn, drive the compressor rotor to rotate. The air turbine starter is supplied with air, typically from an auxiliary power unit.

A starter air valve assembly is positioned intermediate the auxiliary power unit and the air turbine starter. The valve assembly is provided with a control valve that controls the flow of pressurized air to an actuator for a valve member.

The control valve selectively routes air to a solenoid or torque motor, for controlling the passage of the air to the actuator for the valve member.

The control valve must be operable to selectively move the actuator to positions that are less than full open prior to startup. This allows the engine to initially rotate at lower speed operation to slowly warm the engine. Engine rotors may sometimes bow due to an uneven rate of cooling at the top and bottom of the rotor, and this initial slow rotation corrects the bowing.

SUMMARY

A starter air valve for an air turbine starter system has a valve member and an actuator. A rotary spool valve connects to a source of pressurized air. The rotary spool valve has a rotatable valve body and an outer housing. There is also an actuator control for the actuator. The rotatable valve body and the valve housing selectively provide three modes of operation for the starter air valve. A first mode of operation connects pressurized air through the rotatable valve body to communicate with the actuator control, and to receive pressurized air back from the actuator control. The rotatable valve body then communicates the air to the actuator. In a second mode the rotatable valve body blocks communication between the actuator control and the actuator, and delivers air through a variable area port in a wall of the rotatable valve body to bypass the valve member. In a third mode the rotatable valve body blocks communication between the actuator and the actuator control, and connects pressurized air to the actuator without having passed to the actuator control.

A starter air system is also disclosed.

These and other features may be best understood from the following drawings and specification.

DETAILED DESCRIPTION

Figure 1:
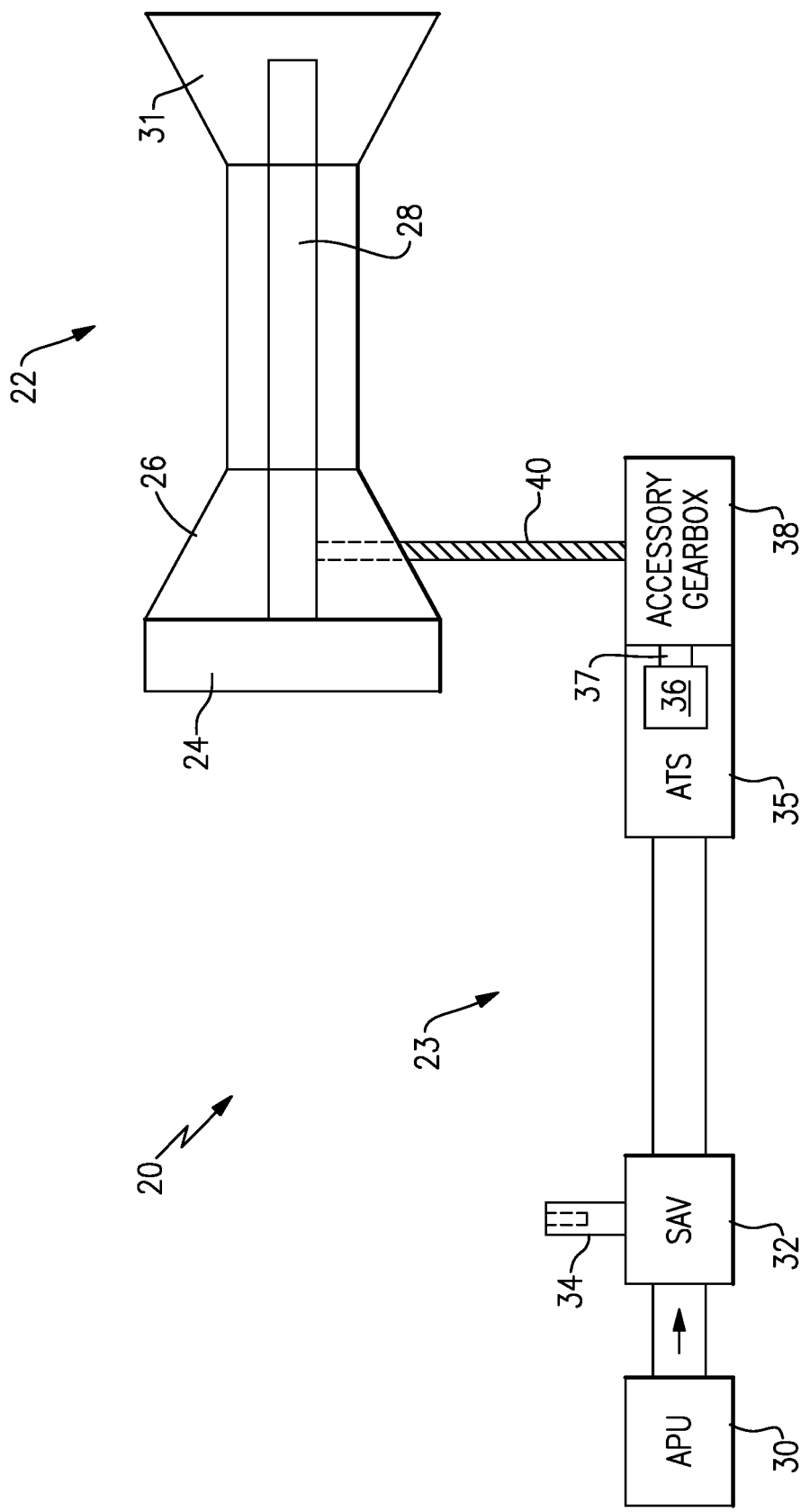
FIG. 1 schematically shows a gas turbine engine and an air turbine starter.

FIG. 1 shows an assembly 20 including a gas turbine engine 22 and a starter air system 23 for starting the gas turbine engine 22, and for providing rotation prior to startup.

The gas turbine engine 22 includes a fan 24, a compressor section 26, a shaft 28 and a turbine 31, all of which are shown schematically. As known compressor section 26, shaft 28 and turbine 31 may all rotate together. An auxiliary power unit (APU) 30 provides air through a starter air valve 32. An actuation assembly 34 is shown for the starter air valve 32 to control the flow of air from an APU 30 downstream to an air turbine starter system 35. Air turbine starter system 35 includes a turbine 36 and a clutch 37. The air drives the turbine 36 to, in turn, drive gears within an accessory gearbox 38 and a drive shaft 40, which drives the shaft 28 to turn gears in the gas turbine engine 22. This drive is shown schematically, and may be generally known.

Figure 2A:
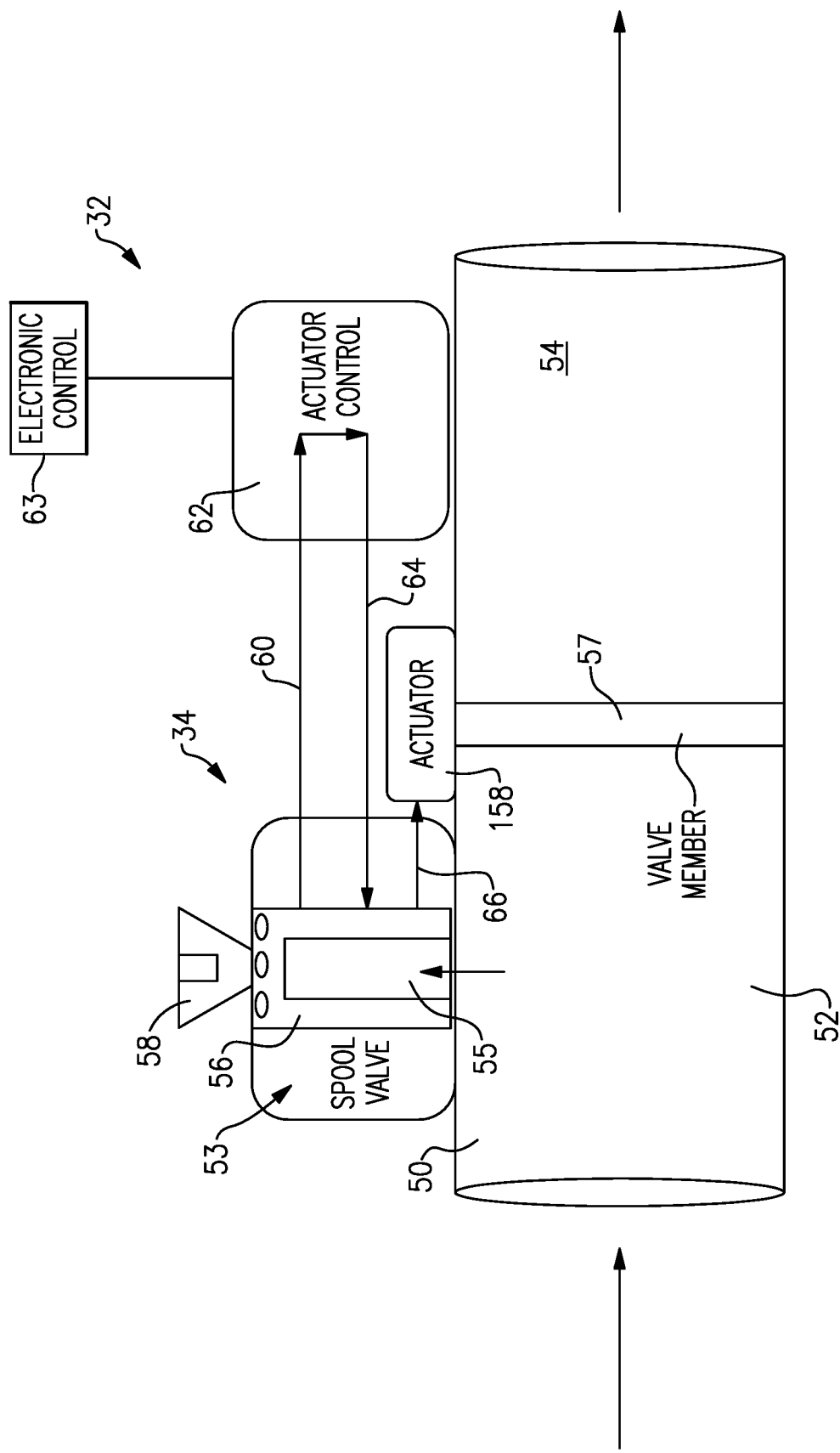
FIG. 2A shows a first mode of a starter air valve.

The starter air valve 32 is shown in FIG. 2A in a first mode. A line 52 has an inlet side 50 and an outlet side 54. A valve member 57 controls the flow of air through the line 52. The actuation assembly 34 includes a rotary spool valve 53 having inlet bore 55 receiving a tap to the pressurized air upstream of the inlet 50. A knob 58 allows selective control of the position of a rotatable valve body 56 of the rotary spool valve 53. Air flows through the rotary spool valve 53 into line 60, which communicates with an actuator control 62, that may be a solenoid, or torque motor. A structure within the actuator control 62 selectively allows, or blocks, flow of the air back into a line 64 returning to the rotary spool valve 53. An electronic control 63 is programmed to control the position of the actuator control 62. From rotor spool valve 53, the air downstream of line 64 passes into a line 66 heading to an actuator 158. The air then moves the actuator 158 to, in turn, adjust the position of the valve member 57.

In an embodiment, valve member 57 may be a butterfly disk. However, this disclosure extends to systems with other valve types.

Figure 2B:
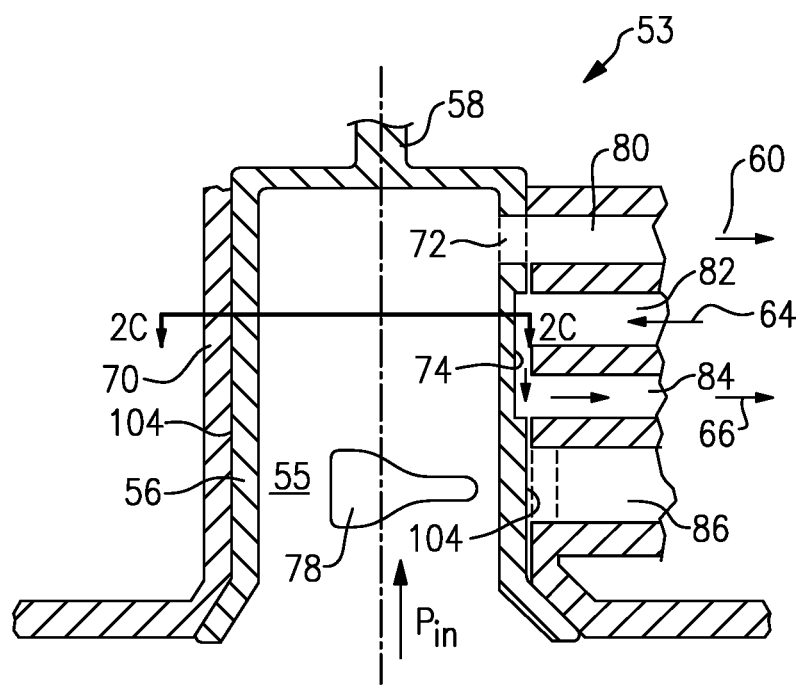
FIG. 2B shows a position of a rotary spool valve which is part of the starter air valve in the FIG. 2A mode.

As shown in FIG. 2B, the rotary spool valve 53 includes an outer housing 70 surrounding a rotatable valve body 56. In the FIG. 2B position, air from the bore 55 can pass through an opening 72 in a wall of the rotatable valve body 56 and into line 80 in the housing 70 to communicate with line 60. Line 64 is shown communicating with a line 82, which passes into a ditch 74 formed in an outer wall 104 of the rotatable valve body 56 to route the air back into a line 84, which communicates with line 66. In this position, another line 86 is shown blocked by outer wall 104 of the rotatable valve body 56. A port 78 is also shown within the rotatable valve body 56.

Figure 2C:
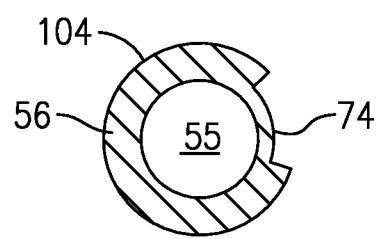
FIG. 2C is a cross-sectional view along line 2C-2C, as shown in FIG. 2B.

FIG. 2C shows a cross-sectional along line 2C-2C of FIG. 2B. As shown, the rotatable valve body 56 has the ditch 74 over a limited circumferential extent. At other locations, there is a nominal cylindrical outer surface 104 of the rotatable valve body 56. Ditch 74 has a smaller outer diameter of the nominal outer surface 104.

Figure 3A:
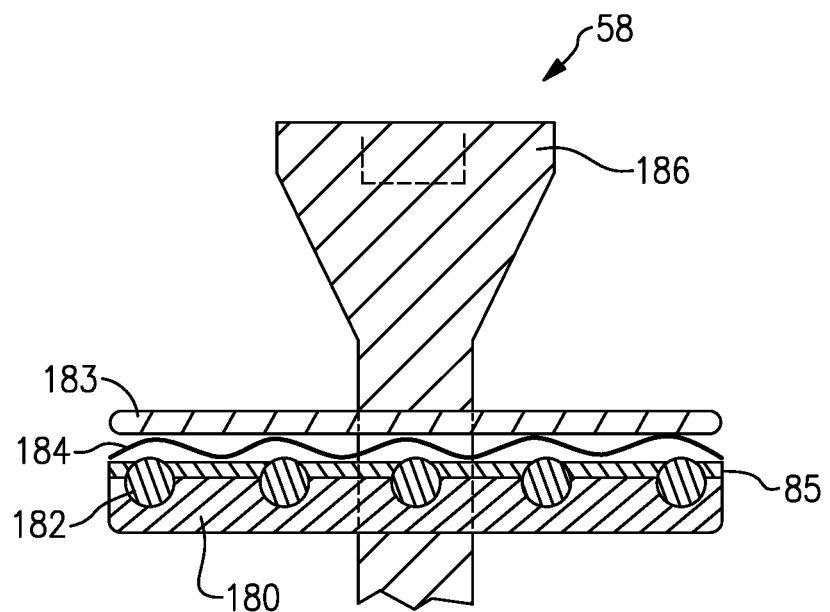
FIG. 3A is a detail of a control knob for the rotary spool valve.
Figure 3B:
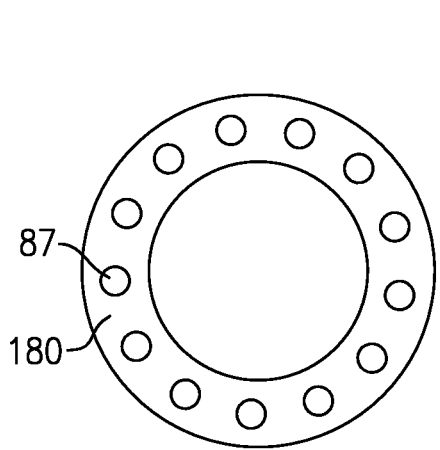
FIG. 3B is a detail of a control knob.

FIG. 3A shows the knob 58 having a head 186, which may be actuated to pull a moving plate 85 away from a plurality of balls 182, which are spring biased into detents in a fixed plate 180. FIG. 3B shows plate 180 having detents 87. A spring 184 biases plate 85 and balls 182 into the detents 87. Plate 183 is also fixed.

Figure 3C:
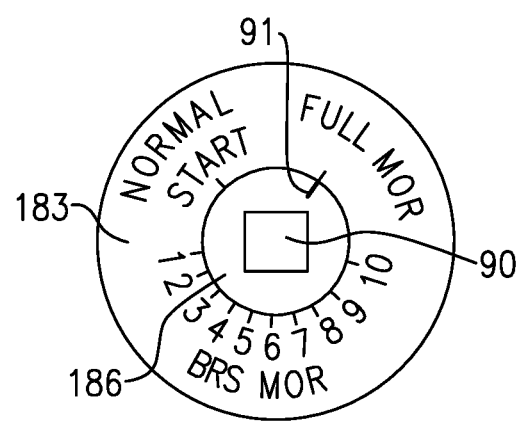
FIG. 3C is a top view of the control knob.

FIG. 3C shows the head 186 and fixed plate 183. The FIG. 2A position would be achieved with a technician inserting a wrench into a socket 90 and rotating until the normal, or start position, is aligned with an indicator 91 on a rotatable central portion. This will align the rotatable valve body 56 in the FIG. 2B position.

Figure 4A:
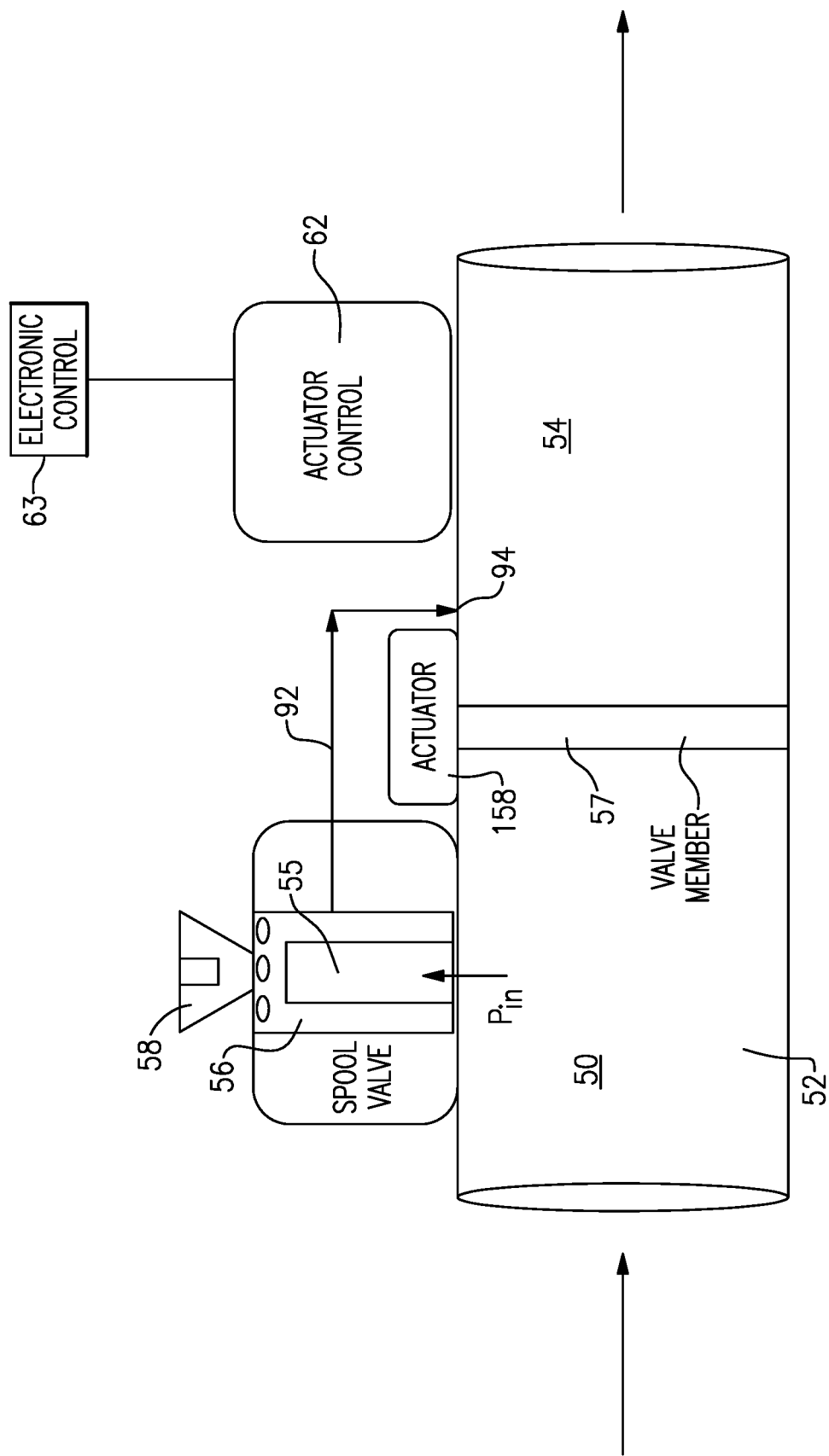
FIG. 4A shows a second mode of the starter air valve.
Figure 4B:
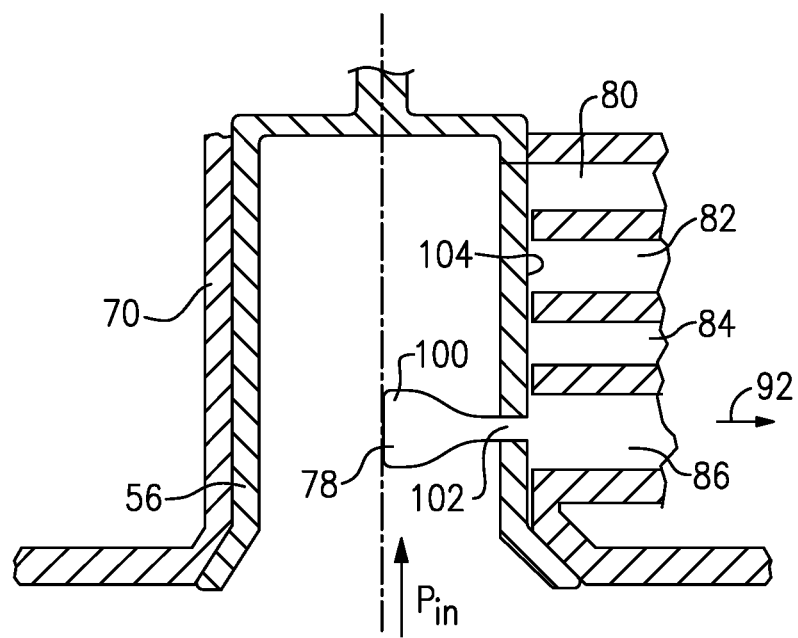
FIG. 4B is a cross-sectional view through the rotary spool valve when in the FIG. 4A position.

As also shown, there are a series of gradations 1-10 that can achieve positions for operation as shown in FIGS. 4A and 4B. In addition, a full manual override position is shown on the valve body. This operation will be explained with regard to FIGS. 5A and 5B.

A second mode is shown in FIG. 4A, the rotatable valve body 56 is now positioned such that air from the bore 55 is delivered into a line 92, which passes into the line 52 at a point 94, bypassing the valve member 57 which is in a closed position. This operation may be utilized when there is a failure between the actuator control 62 or the actuator 158.

As shown in FIG. 4B, in this position, the port 78 in the outer wall 104 of the rotatable valve 56 is now aligned with the line 86, which was blocked in the FIG. 2B position. As can be appreciated, the port 78 changes in size from a smaller portion 102 to a larger portion 100. This increase is achieved by positioning the valve as desired by the increments 1-10 as shown in FIG. 3C. The increments are selected to achieve the bowed rotor start slow rotation, as described above. In this position, communication between lines 80, 82, and 84 is shown blocked by the nominal outer wall surface 104.

In the prior art, in this position, air was still allowed to flow between lines 82 and 84. Thus, the air intended to bypass valve member 57 could flow back to actuator control 62.

Figure 5A:
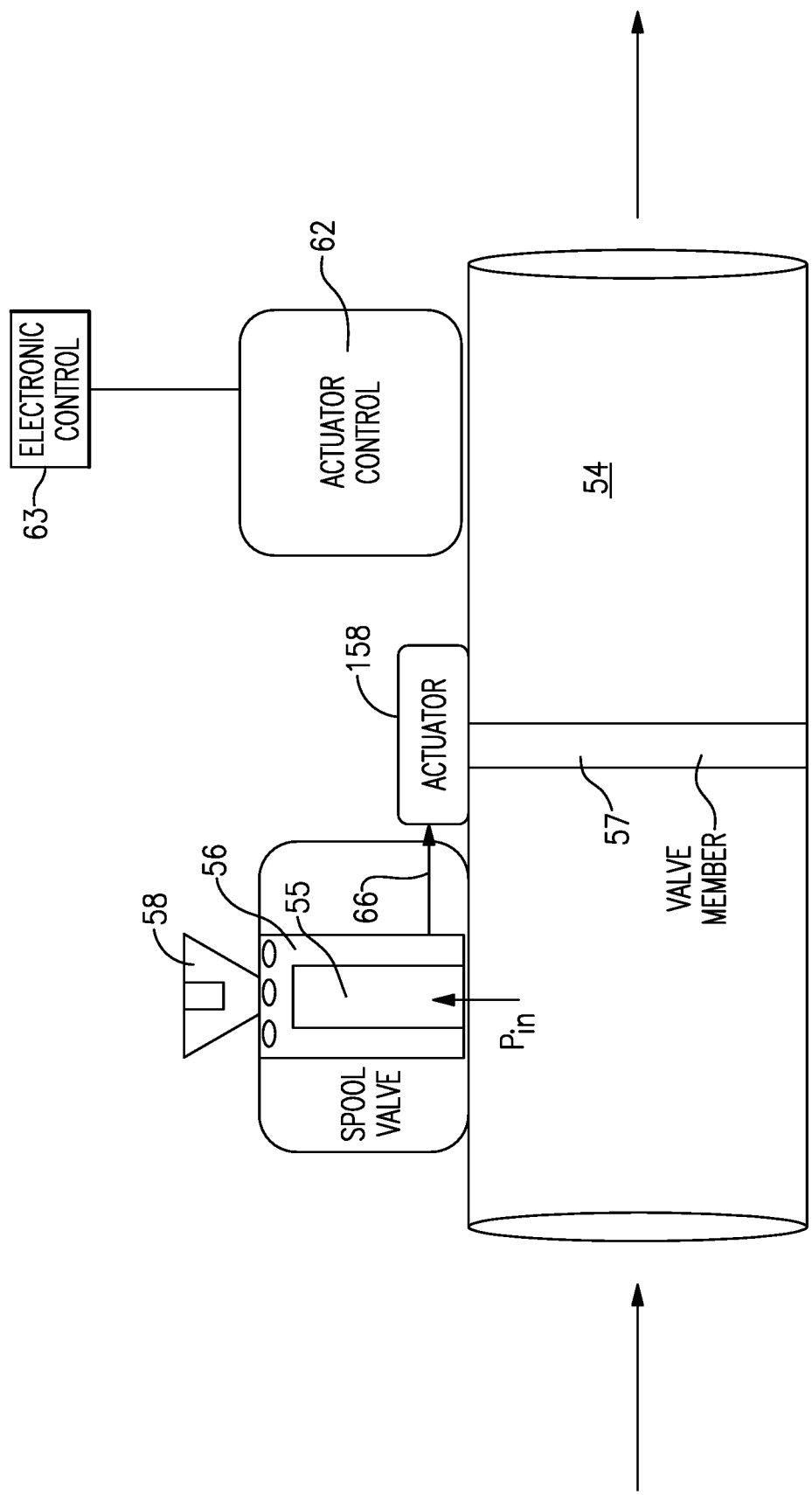
FIG. 5A shows a third mode of the starter air valve.

FIG. 5A shows a third mode of operation. In this position, the rotatable valve body 56 is rotated such that it communicates air from bore 55 directly into line 66 and to actuator 158.

Figure 5B:
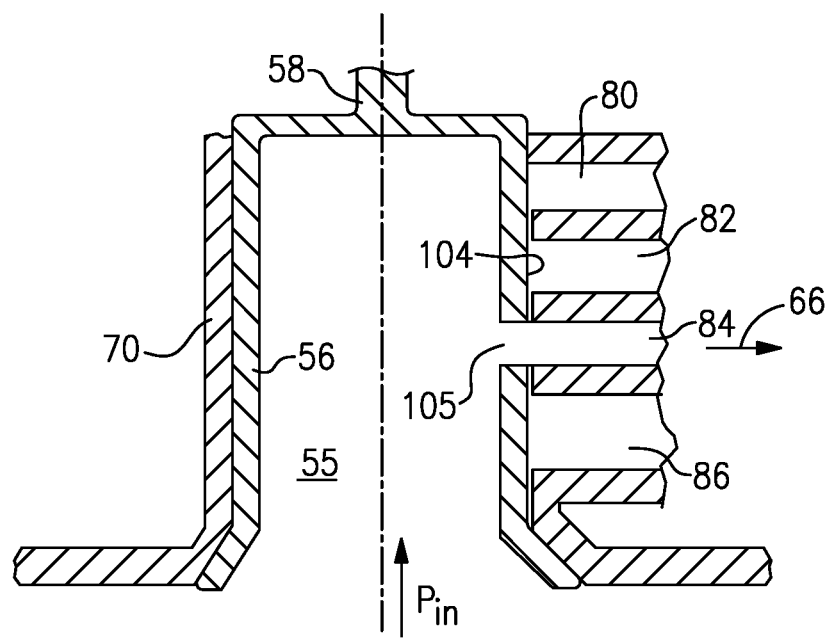
FIG. 5B is a cross-sectional view through the rotary spool valve when in the FIG. 5A position.

As shown in FIG. 5B, a port 105 now communicates air into the line 84 from the bore 55. As also shown, nominal outer wall surface 104 blocks communication between line 82 and line 84. Again, in the prior art, this communication was not blocked.

By delivering the airflow directly to the actuator 158 in this third mode, one should be able to achieve proper positioning of the valve member 57. However, if this does not cause the valve member to move, the actuator 158 itself, has failed.

A starter air valve for an air turbine starter system under this disclosure could be said to include a valve member and an actuator. A rotary spool valve is to be connected to a source of pressurized air. The rotary spool valve has a rotatable valve body and an outer housing. There is an actuator control for the actuator. The rotatable valve body and the valve housing selectively provide three modes of operation for the starter air valve, A first mode of operation connects pressurized air through the rotatable valve body to communicate with the actuator control, and to receive pressurized air back from the actuator control. The rotatable valve body then communicates the air to the actuator. In a second mode the rotatable valve body blocks communication between the actuator control and the actuator, and delivers air through a variable area port in a wall of the rotatable valve body to bypass the valve member. In a third mode the rotatable valve body block communication between the actuator and the actuator control, and connects pressurized air to the actuator without having passed to the actuator control.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A starter air valve for controlling flow of pressurized air through an air line for an air turbine starter system comprising:
    a valve member disposed in said air line and an actuator for said valve member;
    a rotary spool valve fluidly connected to said air line upstream of said valve member to receive pressurized air, said rotary spool valve having a rotatable valve body and an outer housing;
    an actuator control for said actuator;
    said rotatable valve body and said outer housing selectively providing three modes of operation for the starter air valve;
    in a first mode of said three modes of operation, the rotatable valve body fluidly connects to said actuator control to communicate pressurized air from said air line upstream of said valve member through said rotatable valve body to said actuator control, said actuator control selectively blocks or allows flow of pressurized air back to said rotary spool valve, and said rotatable valve body fluidly connects said actuator control to said actuator to communicate pressurized air received back from said actuator control to said actuator;
    in a second mode of said three modes of operation, the rotatable valve body blocks fluid communication from said actuator control to said actuator, and is configured to deliver pressurized air from said air line upstream of said valve member through a variable area port in an outer wall of said rotatable valve body to said air line downstream of said valve member to bypass said valve member; and
    in a third mode of said three modes of operation, the rotatable valve body blocks fluid communication from the actuator control to said actuator, and is configured to deliver pressurized air from said air line upstream of said valve member to said actuator without having passed to said actuator control.

2. The starter air valve as set forth in claim 1, wherein said rotatable valve body including said outer wall, has a ditch such that said outer wall has a smaller diameter inside the ditch than a nominal diameter at an outer surface of the outer wall, said ditch selectively connects a line from said actuator control to a line leading to said actuator.

3. The starter air valve as set forth in claim 2, wherein said actuator control is one of a solenoid or a torque motor.

4. The starter air valve as set forth in claim 3, wherein said variable area port is a third mode port that extends through said outer wall to communicate pressurized air from said air line upstream of said valve member to said line leading to said actuator in said third mode of operation.

5. The starter air valve as set forth in claim 4, wherein said rotatable valve body is manually rotatable with a knob to operate in said first mode, said second mode, and said third mode.

6. The starter air valve as set forth in claim 5, wherein said knob rotates relative to a plate having indicia of positions for said first mode, said second mode, and said third mode.

7. The starter air valve as set forth in claim 1, wherein said valve member is a butterfly disk.

8. The starter air valve as set forth in claim 1, wherein said actuator control is one of a solenoid or torque motor.

9. The starter air valve as set forth in claim 1, wherein said variable area port is a third mode port that extends through said outer wall to communicate pressurized air from said air line upstream of said valve member to a line leading to said actuator in said third mode of operation.

10. The starter air valve as set forth in claim 1, wherein said rotatable valve body is manually rotatable with a knob to operate in said first mode, said second mode, and said third mode.

11. A starter air system comprising:
an air line;
an auxiliary power unit for delivering air to a starter air valve via said air line;
an air turbine starter connected to said air line to receive air downstream of said starter air valve, said air turbine starter driving a shaft to selectively drive rotation of a gas turbine engine;
wherein the starter air valve includes:
a valve member disposed in said air line and an actuator for said valve member;
a rotary spool valve fluidly connected to said air line upstream of said valve member to receive pressurized air, said rotary spool valve having a rotatable valve body and an outer housing;
an actuator control for said actuator;
said rotatable valve body and said outer housing selectively providing three modes of operation for the starter air valve,
in a first mode of said three modes of operation, the rotatable valve body fluidly connects to said actuator control to communicate pressurized air from said air line upstream of said valve member through said rotatable valve body to said actuator control, said actuator control selectively blocks or allows flow of pressurized air back to said rotary spool valve and said rotatable valve body fluidly connects said actuator control to said actuator to communicate pressurized air received back from said actuator control to said actuator;
in a second mode of said three modes of operation, the rotatable valve body blocks fluid communication from said actuator control to said actuator, and is configured to deliver pressurized air from said air line upstream of said valve member through a variable area port in an outer wall of said rotatable valve body to said air line downstream of said valve member to bypass said valve member; and
in a third mode of said three modes of operation, the rotatable valve body blocks fluid communication from the actuator control to said actuator, and is configured to deliver pressurized air from said air line upstream of said valve member to said actuator without having passed to said actuator control.

12. The system as set forth in claim 11, wherein said rotatable valve body including said outer wall, has a ditch such that said outer wall has a smaller diameter inside the ditch than a nominal diameter at an outer surface of said outer wall, said ditch selectively connects a line from said actuator control to a line leading to said actuator.

13. The system as set forth in claim 12, wherein said actuator control is one of a solenoid or torque motor.

14. The system as set forth in claim 13, wherein the variable area port is a third mode port that extends through said outer wall to communicate pressurized air from said air line upstream of said valve member to said line leading to said actuator in said third mode of operation.

15. The system as set forth in claim 14, wherein said rotatable valve body is manually rotatable with a knob to operate in said first mode, said second mode, and said third mode.

16. The system as set forth in claim 15, wherein said knob rotates relative to a plate having indicia of positions for said first mode, said second mode, and said third mode.

17. The system as set forth in claim 11, wherein said valve member is a butterfly disk.

18. The system as set forth in claim 11, wherein said actuator control is one of a solenoid or torque motor.

19. The system as set forth in claim 11. wherein said variable area port is a third mode port that extends through said outer wall to communicate pressurized air from said air line upstream of said valve member to a line leading to said actuator in said third mode of operation.

20. The system as set forth in claim 11, wherein said rotatable valve body is manually rotatable with a knob to operate in said first mode, said second mode, and said third mode.

\* \* \* \* \*